United States Patent [19]

Weber et al.

[11] Patent Number: 5,548,009
[45] Date of Patent: Aug. 20, 1996

[54] STABILIZATION OF ACETATE SYSTEMS

[75] Inventors: Wilhelm Weber; Karl-Heinz Sockel; Hans-Heinrich Moretto, all of Leverkusen, Germany

[73] Assignee: Bayer Aktiengesellschaft, Leverkusen, Germany

[21] Appl. No.: 233,670

[22] Filed: Apr. 26, 1994

[30] Foreign Application Priority Data

May 3, 1993 [DE] Germany .......................... 43 14 502.7

[51] Int. Cl.$^6$ ........................................... C08K 5/42
[52] U.S. Cl. ..................... 524/157; 524/158; 524/166; 528/14; 528/18; 528/23; 528/32
[58] Field of Search .................................. 524/157, 158, 524/166; 528/14, 18, 23, 32

[56] References Cited

U.S. PATENT DOCUMENTS 4,229,548  10/1980  Sattlegger et al. ..................... 528/23
4,567,231  1/1986  Huebner et al. ....................... 524/158
5,310,844  5/1994  Weber et al. .......................... 528/14

FOREIGN PATENT DOCUMENTS 0129318  12/1984  European Pat. Off. .
0468239  1/1992  European Pat. Off. .

*Primary Examiner*—Mark D. Sweet
*Attorney, Agent, or Firm*—Sprung Horn Kramer & Woods

[57] ABSTRACT

A process for improving the storage life of a one-component silicone paste containing an alkali metal phosphate and which cures with elimination of acetic acid on exposure to atmospheric moisture, which comprises adding to such paste an acidic additive bearing the functional group —SO$_3$H or hydrogen chloride in a concentration sufficient to convene the alkali metal phosphate into the alkali metal salt of the acidic additive.

2 Claims, No Drawings

STABILIZATION OF ACETATE SYSTEMS

This invention relates to a process for improving the storage life of one-component silicone pastes which cure with elimination of acetic acid on exposure to atmospheric moisture.

One-component moisture-curing silicone pastes which cure with elimination of acetic acid have been known for many years. They are used as sealants and adhesives, above all in civil engineering. Compounds such as these are typically produced from OH-functional polydimethyl siloxanes, an alkyl triacetoxysilane and pyrogenic silica. In general, nonfunctional polydimethyl siloxanes and dialkyl tin dicarboxylates are additionally used as plasticizers and catalysts, respectively. In addition, the adhesion of the vulcanizates to certain substrates can be improved by the addition of further silanes which act as coupling agents.

The described pastes can be stored for at least 12 months in the absence of moisture without losing any of their effectiveness on application. However, whether they are able to withstand prolonged storage without damage depends upon the composition of the formulation and the type of raw materials used. Formulations containing non-functional polysiloxane plasticizers in particular can show weaknesses in vulcanization after prolonged storage. In many cases, they show hardly any curing 24 months after production and, accordingly, are unusable.

The polysiloxanes used in the production of the silicone pastes curing with elimination of acetic acid are generally prepared from cyclodimethyl siloxanes or short-chain OH-terminated polydimethyl siloxane mixtures. In the most widely used anionic polymerization process, KOH or potassium silanolate, for example, is used as the catalyst. After the ring/chain equilibrium has been established in the presence of the agents forming terminal groups, the reaction mixture has to be neutralized to avoid shifts in equilibrium during working up. Phosphoric acid or a polysiloxane or silyl phosphate containing phosphoric acid is preferably used to neutralize the reaction mixture. The present invention relates to silicone pastes containing polysiloxanes produced by anionic catalysis.

It has surprisingly been found that the storage life of silicone pastes curing with elimination of acetic acid can be improved by the addition of certain quantities of strong acids or compounds which form strong acids in the paste by reaction with the free acetic acid.

Compounds bearing the functional group $-SO_3H$ or hydrogen chloride may be used as the strong acids. Compounds bearing the $-SO_3H$ group include sulfuric acid, metal hydrogen sulfates and alkyl or aryl sulfonic acids.

Advantageously the alkyl radical has 1 to 20, preferably 1 to 10, and particularly 1 to 4, carbon atoms, Advantageously the aryl radical is benzene or naphthalene, preferably benzene, optionally substituted with alkyl of 1 to 4 carbon atoms.

Compounds which release the strong acids mentioned in the presence of acetic acid, for example silyl sulfates or silyl sulfonates or chlorosilanes, may also be added. Another possibility is to add fillers of which the surface is covered with sulfuric acid, metal hydrogen sulfates, sulfonic acids or hydrogen chloride. Sulfuric acid or metal hydrogen sulfates are preferably used. It is particularly preferred to use alkali metal hydrogen sulfates.

The acidic additive may be added at any stage of the paste production process. In order to guarantee uniform distribution throughout the paste, it is best to dilute the additive with one of the constituents of the paste and to incorporate the additive thus diluted after addition of the silica. Where sulfuric acid or alkali metal hydrogen sulfates are used, it has proved to be favorable to use the additive in the form of a paste. The paste in question may be prepared by mixing a solution of the additive in a little water, a polydimethyl siloxane and pyrogenic silica.

The necessary quantity of acid is determined by the concentration of $K^+$ in the polymer mixture. Concentrations of 1 to 20 acid equivalents per $K^+$ equivalent are sufficient for stabilization. 1 to 3 equivalents of acid per equivalent of $K^+$ are preferred.

In calculating the quantity of acid used, it is important to ensure that the paste raw materials do not introduce any strong acid into the system. Should this be the case, the quantity actually required can be determined by preliminary tests based on accelerated ageing tests at elevated temperature.

The invention is illustrated by the following Examples.

EXAMPLE 1

In a planetary mixer, a stabilizer paste A was prepared from 89.2 parts by weight of a trimethyl siloxy-terminated polydimethyl siloxane having a viscosity of 0.1 Pas, 10.0 parts by weight of pyrogenic silica having a BET surface of 150 $m^2/g$ and 0.8 part by weight of 25% sulfuric acid.

A moisture-curing silicone paste B was prepared by mixing the following constituents in the absence of moisture: 57.0 parts by weight of a dihydroxypolydimethyl siloxane having a viscosity of 80 Pas, 30.0 parts by weight of a trimethylsiloxy-terminated polydimethyl siloxane having a viscosity of 0.1 Pas, 3.5 parts by weight of ethyl triacetoxysilane, 9.5 parts by weight of pyrogenic silica having a BET surface of 150 $m^2/g$ and 0.01 part by weight of dibutyl tin diacetate. The polysiloxanes used to prepare the paste contained the reaction product of 13 ppm of potassium hydroxide and an equimolar quantity of phosphoric acid.

0.5 Part by weight of stabilizer paste A was added to 100 parts by weight of silicone paste B. The resulting paste was introduced into an aluminum tube. The tube was subjected to accelerated ageing at 100° C. After the tube had been stored for 10 days at 100° C., a sample was removed and spread out in the form of a 2 mm thick layer. After 24 hours, the material had crosslinked under the effect of atmospheric moisture to form a dry rubber.

EXAMPLE 2

(Comparison):

Silicone paste B was subjected to accelerated ageing at 100° C. without stabilizer paste A. 4 Days after extrusion from the tube, the paste was still tacky and soft.

EXAMPLE 3

In a planetary mixer, a stabilizer paste C was prepared from 89.0 parts by weight of the trimethylsiloxy-terminated polydimethyl siloxane having a viscosity of 0.1 Pas, 10.0 parts by weight of pyrogenic silica having a BET surface of 150 $m^2/g$ and 1.0 part by weight of p-nonylbenzenesulfonic acid.

0.65 Part by weight of stabilizer paste C was added to 100 parts by weight of silicone paste B from Example 1. The resulting paste was treated in the same way as described in Example 1. After accelerated ageing, the paste cured in 24 hours to form a dry rubber.

EXAMPLE 4

In a planetary mixer, a stabilizer paste D was prepared from 88.15 parts by weight of a trimethylsiloxy-terminated polydimethyl siloxane having a viscosity of 0.1 Pas, 10.0 parts by weight of pyrogenic silica having a BET surface of 150 m$^2$/g and 1.85 parts by weight of a 30% solution of potassium hydrogen sulfate in water.

0.5 Part by weight of stabilizer paste D was added to 100 parts by weight of silicone paste B from Example 1. The paste was subjected to accelerated ageing at 100° C. in the same way as described in Example 1. 24 Hours after extrusion from the tube, the material had crosslinked under the effect of atmospheric moisture to form a dry rubber.

EXAMPLE 5

0.4 Part by weight of a mixture E of 96.5 parts by weight of a trimethylsiloxy-terminated polydimethyl siloxane having a viscosity of 0.1 Pas and 3.5 parts by weight of methyl trichlorosilane were added to 100 parts by weight of silicone paste B from Example 1. The paste was subjected to accelerated ageing for 10 days at 100° C. in the same way as described in Example 1. 24 Hours after extrusion from the tube, the material had crosslinked under the effect of atmospheric moisture to form a dry rubber.

It will be understood that the specification and examples are illustrative but not limitative of the present invention and that other embodiments within the spirit and scope of the invention will suggest themselves to those skilled in the art.

What is claimed is:

1. A process for improving the life of an uncured silicone paste which cures by elimination of acetic acid and which is prepared using an anionically polymerized polysiloxane containing an alkali metal phosphate, which comprises adding to the silicone paste an acidic additive selected from the group consisting of sulfuric acid and at least one of an alkali metal hydrogen sulfate, to convert the alkali metal salt of the acidic additive.

2. A process according to claim 1, wherein there are added about 1 to 20 equivalents of the acidic additive per equivalent of the alkali metal ion present in the polydimethyl siloxane.

* * * * *